US012717737B2

(12) United States Patent
Thyamagondlu et al.

(10) Patent No.: US 12,717,737 B2
(45) Date of Patent: Aug. 25, 2026

(54) MULTI-HOST AND MULTI-CLIENT DIRECT MEMORY ACCESS SYSTEM HAVING A READ SCHEDULER

(71) Applicant: Xilinx, Inc., San Jose, CA (US)

(72) Inventors: Chandrasekhar S. Thyamagondlu, Saratoga, CA (US); Kushagra Sharma, Santa Clara, CA (US); Surender Reddy Kisanagar, Telangana (IN)

(73) Assignee: Xilinx, Inc., San Jose, CA (US)

( * ) Notice: Subject to any disclaimer, the term of this patent is extended or adjusted under 35 U.S.C. 154(b) by 56 days.

(21) Appl. No.: 18/344,783

(22) Filed: Jun. 29, 2023

(65) Prior Publication Data

US 2025/0004961 A1 Jan. 2, 2025

(51) Int. Cl.
*G06F 13/28* (2006.01)

(52) U.S. Cl.
CPC .......... *G06F 13/28* (2013.01); *G06F 2213/28* (2013.01)

(58) Field of Classification Search
None
See application file for complete search history.

(56) References Cited

U.S. PATENT DOCUMENTS 6,701,393 B1 3/2004 Kemeny
7,047,362 B2 5/2006 Kim
7,577,773 B1 8/2009 Gandhi
9,292,436 B2 * 3/2016 Wingard .............. G11C 7/1072
10,474,610 B1 11/2019 Schelle
10,983,920 B2 * 4/2021 Thyamagondlu ....... G06F 13/28
11,159,408 B2 * 10/2021 Svennebring ......... H04L 41/147
11,199,853 B1 * 12/2021 Afrouzi .................. B25J 13/006
11,232,053 B1 * 1/2022 Thyamagondlu ....... G06F 13/28
11,500,779 B1 11/2022 Mukherjee
11,994,751 B1 * 5/2024 Wagner .................. G02C 5/146
12,381,751 B2 * 8/2025 Sen ..................... G06F 13/4022
12,411,785 B2 * 9/2025 Thyamagondlu ....... G06F 13/28
2003/0131198 A1 7/2003 Wolrich
2006/0173970 A1 8/2006 Pope
2008/0168259 A1 7/2008 Biran
2011/0219208 A1 * 9/2011 Asaad ....................... G06F 9/06 712/12
2012/0254499 A1 10/2012 Hashimoto
2014/0181410 A1 6/2014 Kalamatianos
2014/0195788 A1 7/2014 Kalogeropulos
2014/0317357 A1 * 10/2014 Kaplan ............... G06F 12/0862 711/137
2014/0344485 A1 11/2014 Dondini (Continued)

*Primary Examiner* — Steven G Snyder
*Assistant Examiner* — Christopher A Bartels
(74) *Attorney, Agent, or Firm* — Kevin T. Cuenot

(57) ABSTRACT

A direct memory access (DMA) system includes a read request circuit configured to receive read requests from a plurality of client circuits. The DMA system includes a response reassembly circuit configured to reorder read completion data received from a plurality of different hosts in response to the read requests. The DMA system includes a read scheduler circuit configured to schedule conveyance of the read completion data from the response reassembly circuit to the plurality of client circuits. The DMA system includes a data pipeline circuit implementing a plurality of data paths coupled to respective ones of the plurality of client circuits for conveying the read completion data as scheduled by the read scheduler circuit.

18 Claims, 4 Drawing Sheets

(56) References Cited

U.S. PATENT DOCUMENTS

2015/0180782 A1* 6/2015 Rimmer ................ H04L 49/112 370/235
2015/0242324 A1* 8/2015 Novakovic ......... G06F 12/0813 711/121
2015/0347292 A1 12/2015 Fujita
2016/0173398 A1* 6/2016 Reinig .................... G06F 13/28 370/235
2016/0292100 A1 10/2016 Olcay
2017/0131904 A1 5/2017 Rajwade
2018/0052803 A1* 2/2018 Graham ................ H04L 49/355
2018/0063016 A1* 3/2018 Gulati ..................... G06F 9/546
2018/0293101 A1* 10/2018 Park ........................ G06F 9/546
2018/0365176 A1* 12/2018 Finkelstein ............. H04L 47/34
2019/0034381 A1* 1/2019 Burstein ............. H04L 67/1097
2019/0347125 A1* 11/2019 Sankaran ............ G06F 9/30181
2020/0151120 A1* 5/2020 Thyamagondlu ... G06F 13/4027
2020/0327084 A1* 10/2020 Choudhary ......... G06F 12/0875
2021/0014177 A1 1/2021 Kasichainula
2021/0117360 A1* 4/2021 Kutch ................... G06F 3/0656
2021/0303570 A1 9/2021 Kondiles
2021/0326075 A1* 10/2021 Kim ...................... G06F 3/0679
2022/0005521 A1 1/2022 Sethuraman
2022/0345417 A1* 10/2022 Kasichainula .......... H04L 47/30
2022/0374150 A1 11/2022 Capri
2023/0012707 A1* 1/2023 Shetty ................. G06F 13/1626
2023/0185745 A1 6/2023 Wu
2023/0231811 A1* 7/2023 Dalal .................. G06F 13/1605 710/308
2023/0298128 A1* 9/2023 Puffer ....................... G06T 1/60 345/520
2024/0015109 A1* 1/2024 Markovitz ............ H04L 49/901
2024/0086356 A1* 3/2024 Ray ....................... G06F 9/3004
2024/0118702 A1* 4/2024 Cella .................. G05B 19/4155
2024/0143528 A1* 5/2024 Marcovitch ......... G06F 13/4221
2024/0192690 A1* 6/2024 Ebrahimi Afrouzi ........................ B25J 13/087
2024/0330191 A1 10/2024 Thyamagondlu et al.
2024/0330213 A1 10/2024 Thyamagondlu et al.
2024/0330215 A1 10/2024 Thyamagondlu et al.
2024/0330216 A1* 10/2024 Thyamagondlu ....... G06F 13/28
2025/0053284 A1* 2/2025 Mannor .............. G06F 3/04845

* cited by examiner

MULTI-HOST AND MULTI-CLIENT DIRECT MEMORY ACCESS SYSTEM HAVING A READ SCHEDULER

TECHNICAL FIELD

This disclosure relates to integrated circuits (ICs) and, more particularly, to a multi-host and multi-client direct memory access system having a read scheduler circuit.

BACKGROUND

Many modern computing environments may include a plurality of host data processing systems (host systems) coupled to one or more peripheral devices. An example of a peripheral device is a hardware accelerator. The host systems may offload tasks to be performed by the peripheral devices. A peripheral device may include a plurality of compute circuits coupled to a direct memory access (DMA) system that facilitates data movement between the host systems and the compute circuits. More particularly, the DMA system facilitates data movement between memory of the host systems that correspond to different processes, functions, and/or applications executing therein and the compute circuits of the peripheral device. The compute circuits, being coupled to the DMA system, are also referred to as "client circuits."

SUMMARY

In one or more example implementations, a direct memory access (DMA) system includes a read request circuit configured to receive read requests from a plurality of client circuits. The DMA system includes a response reassembly circuit configured to reorder read completion data received from a plurality of hosts in response to the read requests. The DMA system includes a read scheduler circuit configured to schedule conveyance of the read completion data from the response reassembly circuit to the plurality of client circuits. The DMA system includes a data pipeline circuit implementing a plurality of data paths coupled to respective ones of the plurality of client circuits for conveying the read completion data as scheduled by the read scheduler circuit.

The foregoing and other implementations can each optionally include one or more of the following features, alone or in combination. Some example implementations include all the following features in combination.

In some aspects, the read scheduler circuit includes an arbitration circuit configured to arbitrate only among each of a plurality of data virtual channels for which at least one beat of read completion data has been received by the response reassembly circuit.

In some aspects, the read scheduler circuit includes a plurality of counters configured to count end-of-packet (EOP) read requests committed to the plurality of hosts for each of a plurality of data virtual channels.

In some aspects, the read scheduler circuit includes an arbitration circuit configured to start scheduling for a selected data virtual channel only in response to determining that an EOP read request has been committed for the selected data virtual channel based on the plurality of counters.

In some aspects, the read scheduler circuit implements a credit mode selected from a plurality of different credit modes on a per data virtual channel basis.

In some aspects, the plurality of different credit modes includes a destination credit mode in which the read scheduler circuit maintains a pool of credits for conveyance of read completion data beat-by-beat.

In some aspects, the plurality of different credit modes include a notify credit mode in which the read scheduler circuit notifies a selected client circuit of available read completion data for a selected data virtual channel and the selected client circuit issues a dequeue request to the read scheduler circuit for a packet of read completion data.

In some aspects, the DMA system includes a data pipeline circuit including a plurality of different data paths. Each data path includes an alignment circuit that is configurable to align read completion data prior to sending the read completion data to a selected client circuit of the plurality of client circuits based on a data alignment specified by the selected client circuit.

In one or more example implementations, a DMA system includes a read scheduler circuit. The read scheduler circuit includes a first arbitration circuit configured to arbitrate among a plurality of data virtual channels corresponding to a plurality of different client circuits. The first arbitration circuit is configured to issue grants to selected data virtual channels of the plurality of data virtual channels. The read scheduler circuit includes a second arbitration circuit coupled to the first arbitration circuit and configured to arbitrate among the plurality of different client circuits for which grants of data virtual channels have been issued by the first arbitration circuit. The read scheduler circuit includes a plurality of first counters including a first counter for each data virtual channel and a plurality of second counters including a second counter for each data virtual channel. The plurality of first counters and the plurality of second counters each count received beats of read completion data on a per data virtual channel basis. The plurality of first counters specify eligibility of each data virtual channel to be considered by the first arbitration circuit for a grant. The plurality of second counters are configured to maintain a count of beats of read completion data to be conveyed to a plurality of client circuits on a per data virtual channel basis.

The foregoing and other implementations can each optionally include one or more of the following features, alone or in combination. Some example implementations include all the following features in combination.

In some aspects, the first arbitration circuit is configured to decrement the first counters by lengths of read requests for the plurality of data virtual channels causing selected ones of the first counters to have negative values. The first counters with negative values are not considered for arbitration by the first arbitration circuit.

In some aspects, the second arbitration circuit is configured to decrement the second counters based on individual beats of read completion data conveyed to the plurality of client circuits.

In some aspects, the read scheduler circuit includes a plurality of third counters configured to count end-of-packet (EOP) read requests that have been committed to a plurality of different hosts for the plurality of data virtual channels.

In some aspects, the first arbitration circuit is configured to start scheduling conveyance of data for a selected data virtual channel of the plurality of data virtual channels only in response to determining that an EOP read request has been committed for the selected data virtual channel based on the plurality of third counters.

In some aspects, first arbitration circuit is configured to arbitrate only among each data virtual channel of the plurality of data virtual channels for which at least one beat of read completion data has been received from a host based on the plurality of first counters.

In some aspects, the first arbitration circuit implements a credit mode selected from a plurality of different credit modes. The plurality of credit modes control scheduling of read completion data provided to the plurality of client circuits.

In some aspects, the plurality of different credit modes include a destination credit mode in which the read scheduler circuit maintains a pool of credits for conveyance of read completion data beat-by-beat.

In some aspects, the plurality of different credit modes include a notify credit mode in which the read scheduler circuit notifies a selected client circuit of available read completion data for a selected data virtual channel and the selected client circuit issues a dequeue request to the read scheduler circuit for a packet of read completion data.

In one or more example implementations, a method includes receiving a plurality of read requests directed to a plurality of hosts. The plurality of read requests are received from a plurality of client circuits conveyed over a plurality of request virtual channels. The method includes receiving beats of read completion data for a plurality of data virtual channels in response to the plurality of read requests. The plurality of data virtual channels are allocated among the plurality of request virtual channels. The method includes arbitrating among different ones of the plurality of client circuits for which at least one beat of read completion data has been received and for which an end-of-packet (EOP) read request has been committed to at least one of the plurality of hosts.

The foregoing and other implementations can each optionally include one or more of the following features, alone or in combination. Some example implementations include all the following features in combination.

In some aspects, the method includes implementing a credit mode selected from a plurality of credit modes. The plurality of credit modes control conveyance of beats of read completion data to the plurality of client circuits.

In some aspects, the method includes aligning read completion data provided to the plurality of client circuits based on a data alignment specified by respective ones of the plurality of client circuits.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
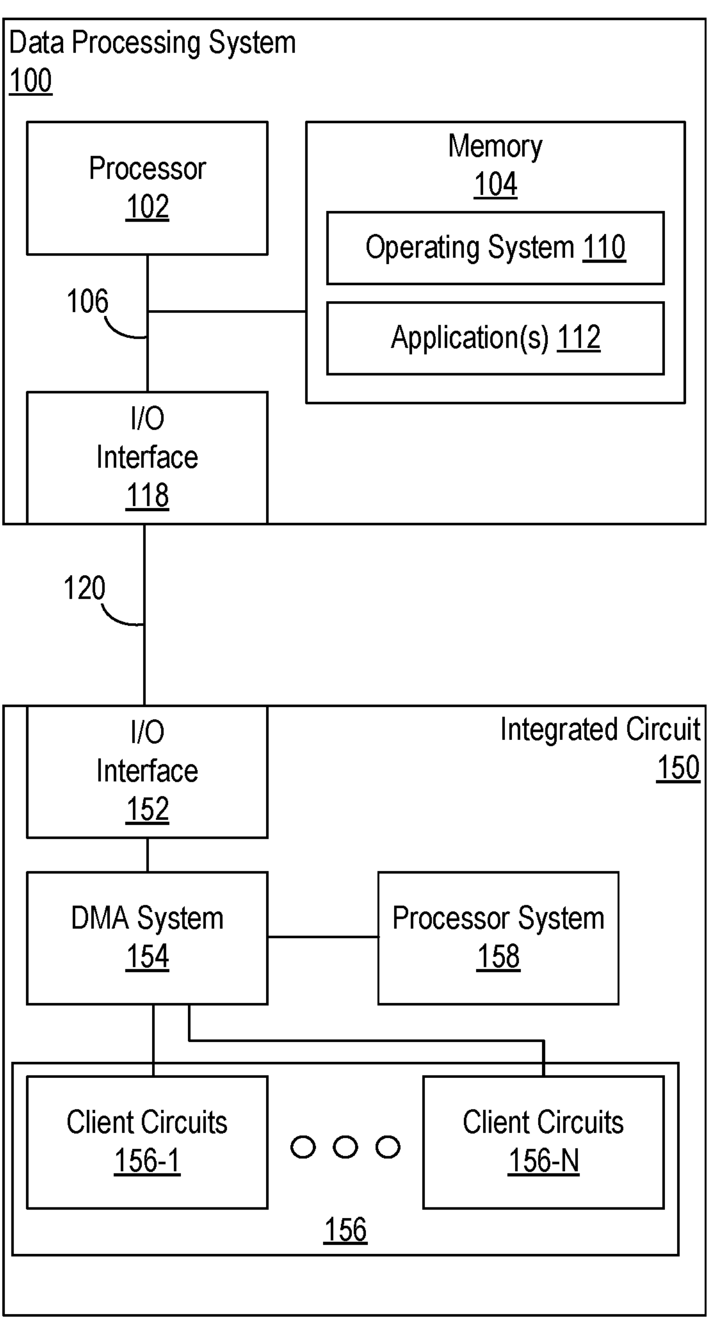
FIG. 1 illustrates an example computing system in which the inventive arrangements may be implemented.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to a multi-host and multi-client direct memory access (DMA) system having a read scheduler circuit. In accordance with the inventive arrangements described within this disclosure, a DMA system is disclosed that is capable of supporting multi-host operation. The DMA system is capable of submitting read requests to a plurality of different host data processing systems and/or host processors (hereafter referred to collectively as "hosts"). The read requests may be submitted via memory mapped interfaces. One or more of the hosts may be external to the IC in which the DMA system is implemented. One or more other ones of the hosts may be embedded in the same IC as the DMA system.

The DMA system also supports multi-client operation. Multiple client circuits may be implemented in the same IC as the DMA system and communicate with the respective hosts. The DMA system is capable of receiving read requests from the multiple client circuits as implemented in the IC. The client circuits may be implemented in any of a variety of different subsystems of the IC including, but not limited to, programmable logic and/or as hardened circuit blocks.

The DMA system, including the read scheduler circuit, supports low latency data movement between the hosts and the client circuits. The DMA system supports data streaming in that data obtained in response to client circuit submitted read requests referred to as "read completion data" may be provided to the client circuits as data streams. Similarly, data received from client circuits may be received as data streams. The read scheduler circuit supports multiple modes of operation for handling credits for transferring read completion data. The particular credit mode used may be specified on a per data virtual channel basis. Regarding request virtual channels and data virtual channels, in general, the data virtual channels are allocated among a plurality of the request virtual channels. A client circuit can use one or more request virtual channels to send read requests. A request virtual channel, however, must not be shared by more than one client circuit. That is, a request virtual channel may be allocated to at most one client circuit. A data virtual channel must not be shared by more than one request virtual channel.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example computing system in which the inventive arrangements may be implemented. As shown, the example computing system of FIG. 1 includes a data processing system 100 coupled to an IC 150. IC 150 is an example of a peripheral device of data processing system 100. For instance, IC 150 may be a hardware accelerator. Though not illustrated, IC 150 may be disposed on a circuit board. The circuit board may have volatile memory such as random-access memory (RAM) (not shown) and/or non-volatile memory (not shown) disposed thereon and coupled to IC 150.

In one aspect, the circuit board may be implemented with a card type of form factor allowing the circuit board to be inserted into a card slot, e.g., an available bus (e.g., Peripheral Component Interconnect Express (PCIe)) slot, of data processing system 100. It should be appreciated, however, that the circuit board may have any of a variety of different form factors so long as IC 150 is coupled to data processing system 100.

Data processing system 100 can include a processor 102, a memory 104, a bus 106, and an input/output (I/O) interface 118. Bus 106 couples processor 102 with memory 104 and I/O interface 118. Data processing system 100 is an example implementation of a host system. It should be appreciated that data processing system 100 is only one example implementation. Data processing system 100 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices. Data processing system 100 may include a plurality of host systems that are virtualized (e.g., virtual machines, containers, etc.).

Processor 102 is implemented as a hardware processor. Processor 102 may be implemented as one or more circuits capable of carrying out instructions contained in computer-readable program code. Processor 102 is an example of a host processor. In an example, processor 102 is implemented as a Central Processing Unit (CPU). Processor 102 may be implemented using a complex instruction set computer architecture (CISC), a reduced instruction set computer architecture (RISC), a vector processing architecture, or other known and/or to be developed architectures. Example processors include, but are not limited to, processors having an x86 type of architecture (IA-32, IA-64, etc.), Power Architecture, ARM processors, and the like.

Bus 106 represents one or more of any of a variety of communication bus structures. By way of example, and not limitation, bus 106 may be implemented as a PCIe bus.

Data processing system 100 typically includes a variety of computer system readable media illustrated as memory 104. Such media may include computer-readable volatile and non-volatile media and computer-readable removable and non-removable media. For example, memory 104 can include computer-readable media in the form of volatile memory, such as RAM and/or cache memory. Data processing system 100 also can include other removable/non-removable, volatile/non-volatile computer storage media. By way of example, memory 104 may include a storage system capable of reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each form of media can be connected to bus 106 by one or more data media interfaces. Memory 104 is an example of at least one computer program product.

Memory 104 is capable of storing program instructions that are executable by processor 102. For example, the program instructions can include an operating system 110, one or more application programs 112, and/or other program code. Processor 102, in executing the program instructions, is capable of performing the various operations described herein attributable to a host.

It should be appreciated that data items used, generated, and/or operated upon by data processing system 100 are functional data structures that impart functionality when employed by data processing system 100. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

I/O interface 118 allows data processing system 100 to communicate with one or more peripheral devices such as IC 150. Examples of I/O interface 118 may include, but are not limited to, network cards, modems, network adapters, hardware controllers, etc. In an example implementation, I/O interface 118 includes a PCIe interface or adapter.

IC 150 may be implemented as any of a variety of different types of ICs. For example, IC 150 may be implemented as a System-on-Chip (SoC), an Application-Specific IC (ASIC), an adaptive IC such as a Field Programmable Gate Array (FPGA), or the like. An adaptive IC is an IC that may be updated subsequent to deployment of the device into the field. An adaptive IC may be optimized, e.g., configured or reconfigured, for performing particular operations after deployment. The optimization may be performed repeatedly over time to meet different requirements or needs.

In the example of FIG. 1, IC 150 includes an I/O interface 152, a DMA system 154, and one or more client circuits 156 (e.g., 156-1 through 156-N). As illustrated, I/O interface 152 is coupled to DMA system 154. In the example, I/O interface 152 may be implemented as one or more PCIe interfaces or adapters. Data processing system 100 and IC 150 communicate over a communication link 120 using their respective I/O interfaces 118, 152. In an example implementation, communication link 120 may be implemented as a PCIe connection.

DMA system 154 is coupled to client circuits 156. Each client circuit 156 may be implemented as a compute circuit and may be implemented as any of a variety of different types of circuits to which computing tasks or jobs may be offloaded. For example, client circuits 156 may be hardened (e.g., ASICs), user-specified circuits implemented using programmable circuitry (e.g., programmable logic such as FPGA gates and/or logic circuitry), third-party Intellectual Property Cores whether implemented as hardened circuits or in programmable circuitry, a data processing circuit array or portions thereof, graphics processing units (GPUs), other hardware processors (e.g., whether hardened or implemented using programmable circuitry), or any combination thereof. In one or more example implementations, one or more of client circuits 156 may be implemented as a Network Interface Card (NIC).

DMA system 154 also may be coupled to a processor system 158. Processor system 158 may include one or more hardware processors capable of executing program code that are embedded in, or included in, IC 150. In this regard, processor system 158 may execute an application and be considered another host processor and/or system to which DMA system 154 may communicate.

In general, DMA system 154 is configured to exchange data between data processing system 100, processor system 158, and client circuits 156. More particularly, DMA system 154 is configured to exchange data between one or more processes, applications, and/or functions executing in data processing system 100 and/or processor system 158 and the various client circuits 156 of IC 150. Though one data processing system is illustrated, it should be appreciated that IC 150 may be accessed by and/or coupled to a plurality of different hosts including one or more virtualized systems by way of DMA system 154 communicating over a plurality of communication links.

In the example, DMA system 154 may be implemented entirely as hardened circuitry (e.g., ASIC circuitry), entirely using programmable circuitry (e.g., programmable logic such as FPGA programmable logic), or as a combination of one or more hardened circuit blocks and one or more circuit blocks implemented in programmable circuitry.

Figure 2:
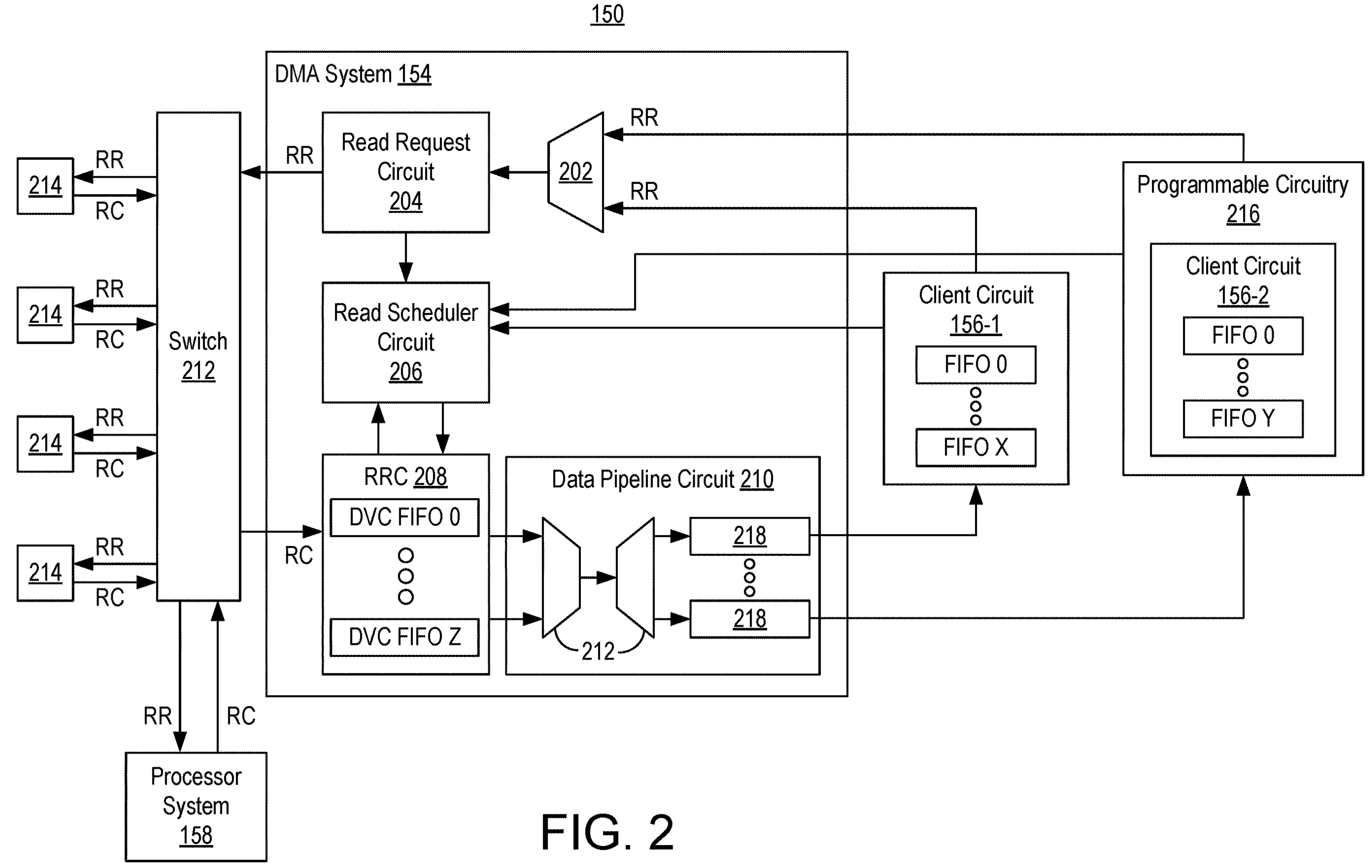
FIG. 2 illustrates an example implementation of a DMA system in the integrated circuit of FIG. 1.

FIG. 2 illustrates an example implementation of DMA system 154 of FIG. 1. FIG. 2 provides a more detailed example of DMA system 154. It should be appreciated that the particular architecture shown in FIG. 2 is provided for purposes of illustration and not limitation. For example, DMA system 154 may include fewer or more of the circuit blocks than illustrated and/or circuit blocks of different varieties than shown.

In the example, DMA system 154 implements a read circuit architecture that responds to read requests submitted by client circuits 156. The read requests are directed to one or more hosts. As illustrated, DMA system 154 can include a read request multiplexer 202, a read request circuit 204, a read scheduler circuit 206, a response reassembly circuit 208, and a data pipeline circuit 210.

In one or more examples, read request circuit 204 may be implemented as, or include, an H2C stream circuit. DMA system 154 may include one or more additional read and/or write circuits not shown. For example, other read circuits may include a descriptor circuit and/or an H2C memory mapped circuit. Other write circuits may include a C2H stream circuit, a C2H memory mapped circuit, and/or a fetch circuit.

The term "C2H" means "card-to-host" referring to the case where IC 150 sends (e.g., writes) data to one or more hosts such as data processing system 100. The term "H2C" means "host-to-card" referring to the case where a host sends data to IC 150. In this regard, H2C refers to the case where IC 150 reads data from the host(s) by client circuits 156 submitting read requests to the hosts. It should be appreciated that C2H and H2C represent the direction of data flow. As such, regardless of whether the data flow is in the C2H or H2C direction, signals may be sent bidirectionally to send data and/or receive any replies and/or acknowledgements.

In the example, read request circuit 204 and read reassembly circuit 208 are coupled to a switch 212. While switch 212 is illustrated as being external to DMA system 154, in one or more other example implementations, DMA system 154 may be included within or considered a part of DMA system 154. Switch 212 is coupled to one or more controllers 214 and to processor system 158. Switch 212 may implement connections to and/or from processor system 158 and controllers 214 as one or more AXI interfaces (e.g., memory mapped) in reference to the Advanced Microcontroller Bus Architecture (AMBA) extensible Interface (AXI) protocol. It should be appreciated that other similar and/or equivalent protocols, communication buses, bus interfaces, and/or interconnects may be used in lieu of AXI and that the various example circuit blocks and/or signals provided within this disclosure will vary based on the particular protocol, communication bus, bus interface, and/or interconnect that is used.

In some aspects, one or more or all (e.g., each) of controllers 214 may be implemented as a bus controller. An example of a bus controller is a PCIe controller. Each of controllers 214 may be configured to communicate over a respective port and communication link with a particular host (not shown). In the example, processor system 158 may be operative as a host of IC 150.

In the example, a plurality of client circuits 156 are illustrated. Client circuits 156 are coupled to read request multiplexer 202 and submit read requests to read request multiplexer 202. Client circuits 156 are also coupled to data pipeline circuit 210 and receive the read completion data via data pipeline circuit 210 in response to submitted read requests. Client circuits 156 may be implemented in different subsystems of IC 150. For purposes of illustration, client circuit 156-1 may be implemented as a hardened circuit block. Client circuit 156-2 may be implemented using programmable circuitry (e.g., programmable logic) 216 of IC 150. The particular number of client circuits 156 shown and the particular subsystems in which the client circuits 156 are implemented is for purposes of illustration and not limitation. Fewer or more client circuits may be implemented and coupled to DMA system 154 and may be implemented in the particular subsystems shown and/or other subsystems of IC 150.

Within this disclosure, from time-to-time, a client circuit 156 may be referred to as a "pipe." Each client circuit 156 communicates with DMA system 154 by way of one or more request virtual channels that are allocated to that client circuit 156. Each request virtual channel may be allocated a predetermined number of data virtual channels. Thus, each client circuit 156, or pipe, may also receive read completion data on a particular data virtual channel of the request virtual channel for that client circuit.

In the example, each client circuit 156 is capable of submitting read requests to read request multiplexer 202. Different ones of client circuits 156 may submit read requests simultaneously. Each read request is directed to a particular host coupled to switch 212. Read request multiplexer 202 is capable of multiplexing the read requests and providing the read requests to read request circuit 204. Read request circuit 204 is capable of scheduling the read requests using an available and/or known arbitration scheme to fairly arbitrate across the different client circuits 156. The read requests may be descriptor fetches, H2C stream read requests, and/or memory mapped read requests from the respective client circuits 156 illustrated.

As noted, each client circuit 156 is assigned or allocated one or more request virtual channels over which the client circuit submits read requests. Each request virtual channel may include, or be allocated, one or more data virtual channels. This means that each client circuit 156 may be assigned one or more request virtual channels with each request virtual channel being allocated one or more data virtual channels. In one aspect, each read request submitted by a client circuit may specify the request virtual channel of the submitting client circuit and/or a particular data virtual channel of the request virtual channel.

In the example, each client circuit 156 includes one or more first-in-first-out (FIFO) memories. For example, client circuit 156-1 includes FIFO memories 0 through X, while client circuit 156-2 includes FIFO memories 0 through Y. In one aspect, each FIFO memory of a client circuit may be assigned to a particular data virtual channel of the request virtual channel(s) assigned to the client circuit such that data conveyed using a particular data virtual channel of a particular client circuit 156 is stored in the corresponding FIFO memory. For example, data received by client circuit 156-1 on data virtual channel 0 of the request virtual channel assigned to client circuit 156-1 may be stored in FIFO 0, data on data virtual channel 1 of the request virtual channel may be stored in FIFO 1, etc.

In the example, client circuits 156 may operate at the same or similar rates. In other examples, each client circuit 156 may consume read completion data at a different rate. Thus, each of the request virtual channels connected to a different client circuit 156 may convey data at a rate that is specific to the client circuit on that request virtual channel.

Read request circuit 204 submits the read requests to switch 212 for conveyance to one of controllers 214 and/or processor system 158. In response to read request circuit 204 submitting (e.g., committing) a read request to switch 212, read request circuit 204 submits a read request description describing the read request to read scheduler circuit 206. The read request description may include or specify information such as the particular client circuit 156 that issued the read request and/or the request virtual channel of the read request, a data virtual channel of the request virtual channel, and whether the read request is an End of Packet (EOP) read request. The read request description also may specify the start data offset of the read request or at least a plurality of bits of the start data offset that may be used to align read completion data to be provided to the requesting client circuit.

Read completion data (e.g., illustrated as "RC" in FIG. 2) from the respective hosts is received by switch 212 and provided to response reassembly circuit (e.g., "RRC" in FIG. 2) 208. Each portion, e.g., beat, of received read completion data may specify a particular data virtual channel. Beats of read completion data received in response to the read requests may be received out of order with respect to the plurality of read requests being operated on. Beats of data for a particular read request submitted on a given request virtual channel are received in order and are placed in respective data virtual channel buffers DVC FIFO 0 through DVC FIFO Z of response reassembly circuit 208. The data virtual channel buffers (DVC FIFOs) are organized based on data virtual channels (e.g., where each data virtual channel corresponds to a particular DVC FIFO). Accordingly, response reassembly circuit 208 stores received read completion data in a buffer DVC FIFO 0 through DVC FIFO Z therein that is reserved for, or dedicated to, the particular data virtual channel specified by the received read completion data.

For purpose of illustration, large read requests from client circuits may be broken into DVC FIFO sized chunks (e.g., PCIe chunks). Consider the case where a single, large read request from a client circuit is broken down into 2 DVC FIFO sized chunks referred to as chunk 0 and chunk 1. All of the completions for chunk 0 will come back in order with respect to each other. All of the completions for chunk 1 will come back in order with respect to each other. There is no ordering guarantee, however, between completions from chunk 0 and chunk 1. Such completions may come back interleaved or completions from chunk 1 may come before those from chunk 0, or any other order.

As each beat of data is received, response reassembly circuit 208 notifies read scheduler circuit 206 of the received beat of read completion data by providing beat indicator signal, e.g., a pulse, to read scheduler circuit 206. The beat indicator signal may specify or indicate the particular data virtual channel for which the beat of read completion data has been received. In response to receiving beat indicator signal from response reassembly circuit 208, read scheduler circuit 206 is capable of issuing a pull request to response reassembly circuit 208. The issuance of a pull request may depend on other conditions also being met such as the availability of sufficient credit for the recipient client circuit 156 to which the beat of read completion data is to be conveyed and/or a dequeue request having been received from the recipient client circuit 156. Further conditions for conveying data are described in greater detail in connection with FIG. 3. Each pull request specifies a particular data virtual channel for which a beat of read completion data is to be sent.

In the example, response reassembly circuit 208 supports 24 data virtual channels that enable parallel read completion handling. Use of data virtual channels by response reassembly circuit 208 avoids head-of-line blocking while servicing read requests. The 24 data virtual channels may be allocated among different ones of client circuits 156. In one or more examples, the particular number of request virtual channels and/or data virtual channels allocated to the request virtual channels and, as such to the different client circuits 156, may be configurable. As such, the number of request virtual channels and/or data virtual channels may be adjustable based on user requirements. The allocation of request virtual channels to client circuits and the allocation of data virtual channels to request virtual channels may be performed at initialization of DMA system 154 based on user provided configuration data. The particular number of request virtual channels and/or data virtual channels supported is not intended as a limitation. The total number of request virtual channels and/or data virtual channels supported as well as the maximum number of request virtual channels and/or data virtual channels permitted may be higher or lower than described.

In response to receiving a pull request from read scheduler circuit 206, response reassembly circuit 208 is capable of outputting a beat of read completion data from the specified DVC FIFO to data pipeline circuit 210. The data for different read requests issued for a given request virtual channel may be returned in any order. Read reassembly circuit 208 is capable of ordering the data for each data virtual channel based on the order in which requests were issued on that data virtual channel.

Data pipeline circuit 210 may include switch 212 and a plurality of data paths. In one aspect, each data path may use an aligner circuit 218 that is capable of aligning read completion data conveyed to respective ones of the client circuits 156. In one or more examples, the number of aligner circuits 218 may correspond to the number of client circuits 156 on a one-to-one basis. An aligner circuit 218, for example, may be included per active client circuit 156. This implementation is facilitated by switching to a different packet for a different client circuit 156 at the data virtual channel boundary.

For purposes of illustration, the read completion data bus over which read completion data is received from the hosts may be implemented as 128 bytes in width and address aligned. The data bus to each client circuit 156 may be implemented as a 64-byte wide data path. The aligner circuits 218 are capable of implementing a particular alignment of the read completion data required by the respective client circuits 156 to which the read completion data is being provided. In one aspect, the particular data alignment to be used is specified at the time of the read request. That is, the alignment of data as provided to each client circuit 156 is configurable in aligner circuits 218 on a per read request basis.

Figure 3:
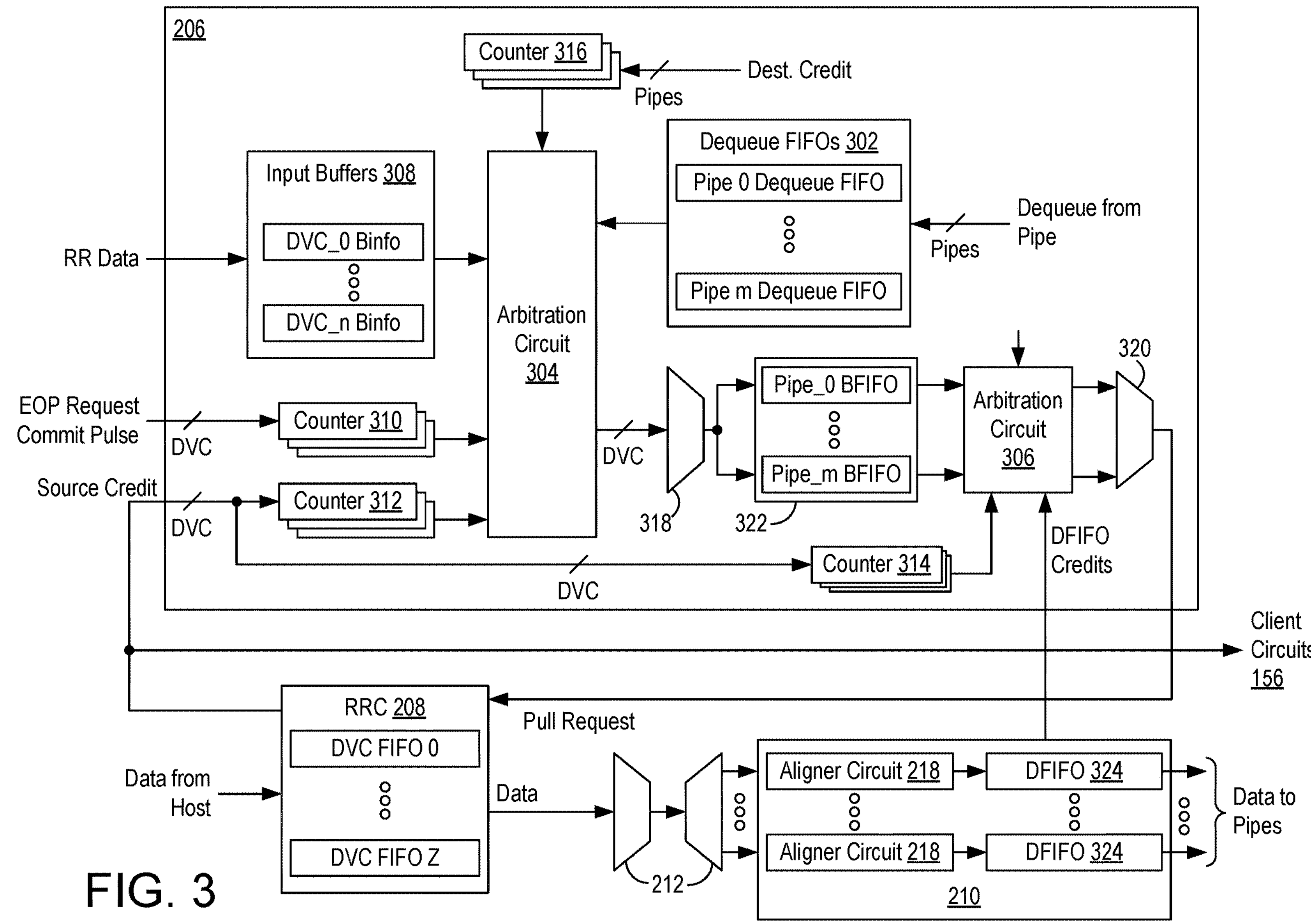
FIG. 3 illustrates an example implementation of read scheduler circuit of the DMA system of FIG. 2.

FIG. 3 illustrates an example implementation of read scheduler circuit 206 of FIG. 2. In the example, read scheduler circuit 206 includes a plurality of dequeue FIFOs 302, an arbitration circuit 304 (e.g., a "first arbitration circuit"), an arbitration circuit 306 (e.g., a second arbitration circuit), input buffers 308, counters 310, 312, 314, and 316, demultiplexer 318, and multiplexer 320.

As discussed, in response to read request circuit 204 receiving read requests, read request circuit 204 submits read request descriptions to read scheduler circuit 206. The read request descriptions are stored in input buffers 308. The read request descriptions describe read requests that have been committed or issued to a host. In the example, input buffers 308 include a plurality of buffers (e.g., FIFO memories) organized according to data virtual channel. Input buffers 308 include one buffer for each data virtual channel. The input buffers are illustrated in FIG. 3 as DVC_0 Binfo through DVC_n Binfo (e.g., where "Binfo" stands for buffer information). Thus, the received read request description for each read request is stored in the particular buffer that is assigned to or allocated to the data virtual channel of the read request as specified in the read request description.

In general, read scheduler circuit 206 is capable of tracking or maintaining a count of the number of read requests committed to a host for each data virtual channel. This is implemented as the read request descriptions are stored in the input buffers 308 according to data virtual channel.

Response reassembly circuit 208 receives beats of read request data. Because request virtual channels are supported, the possibility exists that all of the space available in response reassembly circuit 208 may be consumed by a data virtual channel belonging to a single request virtual channel. In one or more example implementations, this condition is avoided by reserving a selected amount of memory (e.g., 4 KB) for each data virtual channel in response reassembly circuit 208. In the example, a more detailed illustration of the buffers is shown organized according to data virtual channel, where each buffer is illustrated as FIFO memory corresponding to a particular data virtual channel (e.g., on a one-to-one basis). Each DVC FIFO of response reassembly circuit 208 is used to store beats of data in the order received for the particular data virtual channel (e.g., 0 through Z).

In the example, read completion data from a host may be out-of-order. Read reassembly circuit 208 is capable of reordering the read completion data for each data virtual channel. In response to each in-order beat of read completion data being formed, for a particular data virtual channel, response reassembly circuit 208 issues a source credit that is provided to counters 312 and counters 314. For example, response reassembly circuit 208 is capable of issuing credit by outputting a beat indicator signal as previously described. Read reassembly circuit 208, in response to reordering read completion data, is capable of sending a pulse to read scheduler circuit 206 for each beat of in-order-data available in read reassembly circuit 208. In the example of FIG. 3, counters 310, 312, and 314 count on a per-virtual channel basis.

In the example, counters 312 include one counter for each data virtual channel. As each beat of in-order read completion data is available in the read reassembly circuit 208, response reassembly circuit 208 generates a beat indicator signal for that data virtual channel that increments the count of the counter for the data virtual channel. Thus, counters 312 maintain a count of the number of beats of in-order data available in read reassembly circuit 208 on a per-data virtual channel basis. Counters 312 are implemented and incremented the same as or substantially similar to counters 314. Whereas counters 312 are used by arbitration circuit 304, counters 314 are used by arbitration circuit 306.

While counters 312 and 314 are incremented the same way in response to received beats of read completion data, counters 312 are decremented differently than counters 314. Counters 312 are decremented based on the length of the read request. Counters 314 are decremented one-by-one as beats of read completion data are pulled from response reassembly circuit 208 to be provided to client circuits 156.

For example, if a counter 312-1 is incremented by one due to the receipt of a beat of read completion data, counter 312-1 will have a counter value of one. A counter 312 with a positive value is eligible for arbitration by arbitration circuit 304. Arbitration circuit 304 may issue a grant for the data virtual channel corresponding to counter 312-1. In response to issuing a grant for the data virtual channel corresponding to counter 312-1, arbitration circuit 304 decrements counter 312-1 by the length of the request. If the length was 64, counter 312-1 will be decremented by 64 resulting in a counter value of −63. Once counter 312-1 has a negative value, that data virtual channel is not eligible for arbitration by arbitration circuit 304. This condition prevents read scheduler circuit 206 from mistakenly issuing a further grant for a data virtual channel that is already being processed and for which the read completion data has not yet been conveyed to the client circuit 156. Arbitration circuit 304 does not issue any further grants for the data virtual channel until counter 312-1 turns positive again. Counter 312-1 is incremented for each further beat of read completion data received for the data virtual channel. Thus, once the remaining beats of read completion data are received for the read request, counter 312-1 returns to zero. Upon receipt of a further beat of read completion data for the data virtual channel, counter 312-1 will turn positive (e.g., have a value of 1) which renders counter 312-1 and the corresponding data virtual channel eligible for arbitration by arbitration circuit 304.

Thus, counters 312 are used by arbitration circuit 304 to determine which of the data virtual channels are eligible for arbitration. Only those data virtual channels with counters having a positive value may win arbitration as performed by arbitration circuit 304. In the example of FIG. 3, the beat indicator signals are also provided to the respective client circuits 156 for which the beat of read completion data was received. data was retrieved.

Response reassembly circuit 208 is operative to reorder beats of read completion data received out of order. That is, read completion data may be received by response reassembly circuit 208 for a plurality of different read requests in an order that is not correlated or the same as the order in which the read requests were committed by read request circuit 204. Response reassembly circuit 208 reorders the beats of read completion data by placing beats of read completion data into the particular data virtual channel FIFO allocated to the data virtual channel specified by the received beat of read completion data.

The order of beats of read completion data as stored within each respective DVC FIFOs of response reassembly circuit 208 will be in order with respect to the ordering of read requests for the corresponding data virtual channel. This functionality of response reassembly circuit 208 allows client circuits 156 to form chains of multiple read requests to request larger packets. Each read request may be provided from a client circuit 156 requesting a beat of data with the last read request of the chain of read requests for the larger packet having the EOP flag set indicating that the read request is the last read request for the packet of data being requested. A read request with the EOP flag set is referred to herein as an EOP read request. Response reassembly circuit 208 stitches together the beats of read completion data by placing the beats within a same data virtual channel FIFO. This allows a packet of data to be formed by response reassembly circuit 208 from non-contiguous regions of host memory by the client circuit 156 chaining together multiple read requests.

In one or more examples, read scheduler circuit 206 supports a configurable data conveyance mode. For example, read scheduler circuit 206 supports a plurality of different data conveyance modes also referred to herein as "credit modes." The data conveyance mode is configurable, or selectable, on a per request virtual channel basis. Client circuits 156 are capable of providing credits upfront or may be notified of in-order data availability and, in response to the notification of in-order data availability, send a subsequent dequeue request to obtain the data.

A first credit mode is referred to as the "destination credit mode." In the destination credit mode, read scheduler circuit 206 maintains a prepopulated pool of credits. In one aspect, counters 316 may be used to store the available credits of client circuits 156. Each counter 316 may correspond to a particular data virtual channel. Read scheduler circuit 206 is capable of scheduling the delivery of a beat of read completion data to a particular client circuit 156 in response to determining that the counter 316 of the data virtual channel for which the beat of read completion data was received has one or more credits. One credit is consumed for a data virtual channel for each beat of read completion data that is sent to the client circuit. Thus, the destination credit mode operates on a per-beat basis where credits are tracked for each beat of read completion data conveyed to a client circuit 156.

A second credit mode is called the "notify credit mode." The notify credit mode, unlike the destination credit mode, is a pull-mode mechanism where the client circuit is informed about availability of in-order data and the client circuit has the option to pull the data when the client circuit wishes. Further, the client circuit may choose which data virtual channel for which the data is obtained. In the case where a given data virtual channel is operating using the destination credit mode, read scheduler circuit 206 schedules the sending of beats of read completion data from response reassembly circuit 208 to the buffer of the client circuit corresponding to the data virtual channel. In the notify credit mode, in one aspect, multiple beats of read completion data forming an entire packet of data are provided to a particular buffer of the client circuit based on data virtual channel. In another aspect, in the notify credit mode, one or more beats of read completion data may be provided to a particular buffer of the client circuit based on data virtual channel.

In one aspect, as generally discussed, the client circuits 156 are notified of the availability of in-order beats of read completion data as each beat of read completion data is ordered by response reassembly circuit 208. Client circuits 156 may issue a dequeue request to read scheduler circuit 206, where the dequeue request instructs read scheduler circuit 206 to start scheduling the sending of beats of read completion data for a particular data virtual channel to that client circuit 156.

In the example, dequeue FIFOs 302 include a dequeue FIFO for each client circuit 156 (e.g., pipe). Thus, each client circuit 156, or pipe, has a dedicated dequeue FIFO as part of dequeue FIFOs 302 to which the dequeue requests may be provided and stored. Arbitration circuit 304 arbitrates among committed read requests as represented by the read request descriptions stored in input buffers 308 to select arbitration winners for which grants are issued. Arbitration circuit 304, for an issued grant, pushes the winning read request description to a pipe FIFO memory 322 that includes the data virtual channel of the granted read request description.

In issuing a grant for a winning or selected read request descriptor from an input buffer 308, arbitration circuit 304 ensures that the winning read request descriptor meets a variety of different conditions. The conditions that arbitration circuit 304 ensures are met include:

- Choosing a read request description from a data virtual channel specific input buffer 308 that has at least one beat of read completion data available response reassembly circuit 208 based on counters 312.
- Arbitration circuit 304 ensures that the destination client circuit 136 has sufficient credit available whether in counters 316 or by virtue of having a received a dequeue request for an entire packet.
- Arbitration circuit 304 also ensures that an EOP read request has been committed for the data virtual channel based on counters 310.

Thus, arbitration circuit 304 is capable of issuing a grant for even a single beat of read completion data if the above conditions are met. This ensures low latency operation as not all data for a packet need be received from the host(s) prior to the start of conveying beats of read completion data.

By ensuring that the EOP read request has been committed, arbitration circuit 304 does not start scheduling read completion data for a given data virtual channel until all requests for a packet have been committed. Without such a check in place, arbitration circuit 304 may attempt to process the data virtual channel with only partial data available where the remaining data comes back from the host(s) too slowly causing a delay or stall. Such a check also avoids the issue of the read scheduler circuit 206 being unaware as to whether the requesting client circuit has issued all of the necessary read requests. This condition also prevents head of line blocking.

Pipe FIFO memories 322 are organized according to client circuits 156 or pipes. Each client circuit 156 has a dedicated pipe FIFO memory 322 that is capable of storing read request descriptions from prior received read requests that have been committed and issued grants by arbitration circuit 304. Demultiplexer 318 places the granted read request descriptors in appropriate ones of pipe FIFO memories 322. Demultiplexer 318 is capable of using the data virtual channel and/or request virtual channel to place each granted read request descriptor into the correct pipe FIFO memory 322.

Arbitration circuit 306 is capable of implementing an arbitration technique to select particular read request descriptions from pipe FIFO memories 322. All heads of pipe FIFO memories 322 that have at least one read request description stored therein participate in the arbitration performed by arbitration circuit 306. In selecting a particular read request description for dequeuing, arbitration circuit 306 issues a pull request for each beat of data for the winning read request descriptor. In response to submitting each pull request to response reassembly circuit 208 through multiplexer 320, arbitration circuit 306 is capable of decrementing the particular counter 314 for the data virtual channel specified by the winning read request description. Arbitration circuit 306 is capable of continuing to issue read requests to pull data for the winning read request description (s) until the relevant counter(s) 314 reach zero.

In addition, arbitration circuit 306 may also ensure that each data FIFO memory 324 of data pipeline circuit 210, which may be pipe or client circuit 156 specific, has sufficient space to receive a beat of read completion data from response reassembly circuit 208 for conveyance to the destination client circuit 156. In one aspect, arbitration circuit 306 is capable of implementing an arbitration technique that chooses among different pipe FIFO memories 322 at each beat boundary. This provides fast and low latency operation.

For the winning pipe FIFO selected by 2 arbitration circuit 306, multiplexer 320 provides a pull request for the corresponding data virtual channel FIFO in response reassembly circuit 208. The beat of read completion data from the selected data virtual channel FIFO is output to switch 212 and to data pipeline circuit 210. Switch 212 are capable of placing the read completion data in the correct data path based on information contained in the read completion data itself. As illustrated, the read completion data is fed through an aligner circuit 218 that is allocated to the pipe and a data FIFO memory (DFIFO) 324 also allocated to the pipe. A data path of data pipeline circuit 210 is formed of one aligner circuit 218 and the particular data FIFO memory that the aligner circuit 218 feeds data. Due to the modal nature of the DMA system 154, the number of aligner circuits 218 required may be less than the number of active pipes or client circuits 156.

Each of aligner circuits 218 is capable of packing the beat of read completion data being provided to the client circuit and aligning the data based on the particular alignment specified by the read request submitted by the client circuit and for which the read completion data was returned. The per read request beat alignment operation of aligner circuits 218 allows each aligner circuit 218 to pack data together from different read requests to form a larger packet.

In one aspect, a start offset address from the Binfo (e.g., as stored in input buffers 308) is consumed by read scheduler circuit 206 to determine an exact number of beats of data that will be sent to the client circuits and number of credits to be consumed. Aligner circuits 218 are provided with a similar start offset address from response reassembly circuit 208. Response reassembly circuit 208 is capable of storing some information when processing the read request and attaching that information to the read completion data when sending that read completion data to data pipeline circuit 210.

In one or more example implementations, rather than using a plurality of data FIFO memories 324 in data pipeline circuit 210, a single memory circuit may be used where, using linked lists, the circuit implements a number of DFIFOs 324 (e.g., data paths) corresponding as the total number of clients. Through configuration and/or programming, the space in the memory circuit may be divided among the active client circuits and 0 entries may be allocated to inactive client circuits. A round robin arbitration circuit may be used where the memory circuit has a single input port with the FIFO channel specified at the input to select one of the virtual FIFOs as implemented by the linked-lists.

Read scheduler circuit 206 is capable of providing low-latency operation and conveyance of data to client circuits 156 by allowing the conveyance of data as soon as in-order read completion data is available. Further, the architecture described is capable of providing low latency performance despite the rate of data arriving from the hosts and the rate of sinking of data to the client circuits being heterogeneous.

Figure 4:
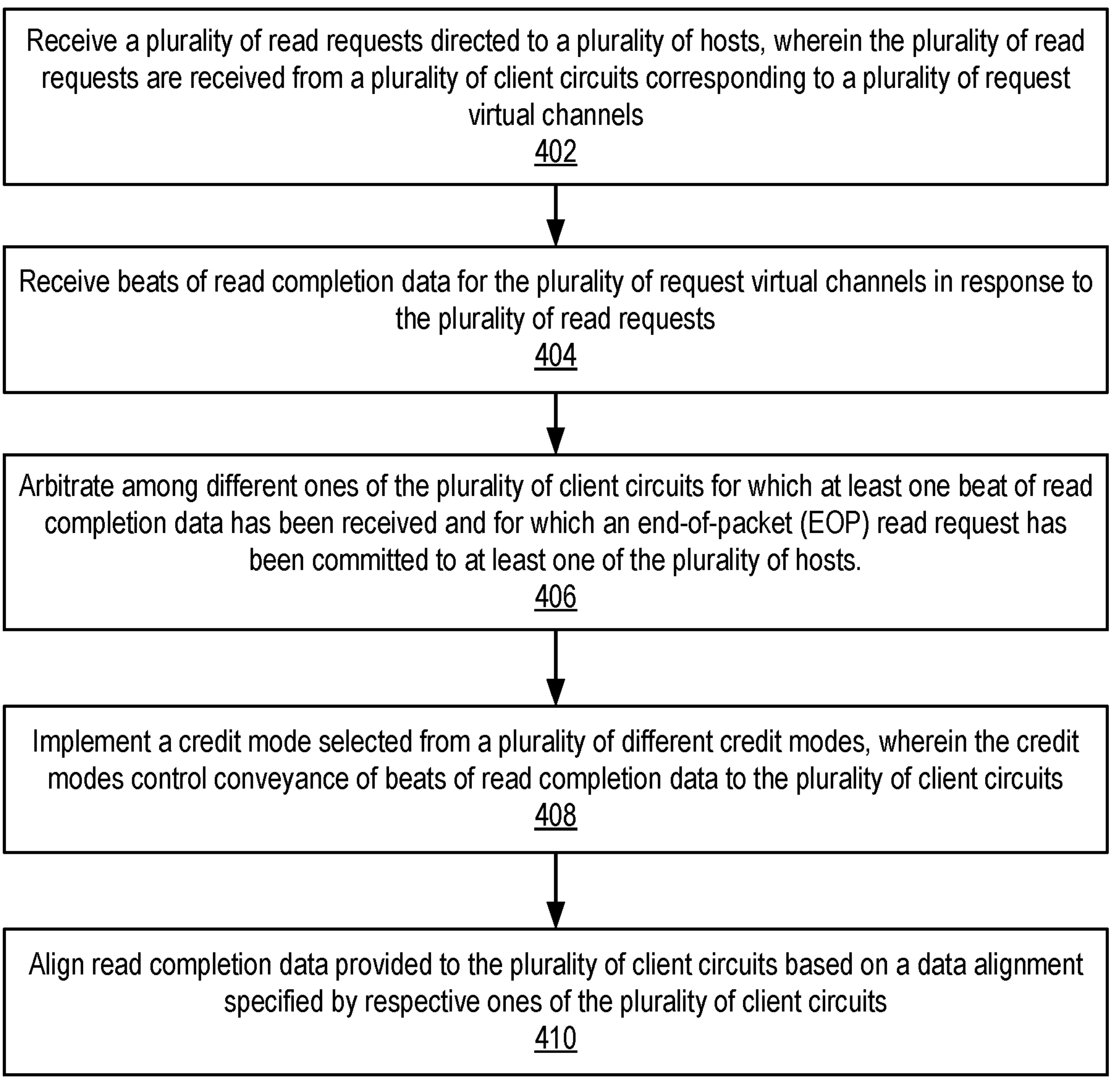
FIG. 4 illustrates an example method of operation of the DMA system and read scheduler circuit described herein.

FIG. 4 illustrates an example method 400 of operation of DMA system 154 and, more particularly, of read scheduler circuit 206 as described herein.

In block 402, the DMA system receives a plurality of read requests directed to a plurality of hosts. The plurality of read requests are received from a plurality of client circuits 156 corresponding to a plurality of request virtual channels. For example, read request circuit 204 is capable of receiving the read requests from a plurality of client circuits 156.

In block 404, DMA system 154 receives beats of read completion data for the plurality of request virtual channels in response to the plurality of read requests. For example, response reassembly circuit 208 receives the beats of read completion data for the read requests. Response reassembly circuit 208 is configured to reorder read completion data received from a plurality of different hosts in response to the read requests based on request virtual channels and the data virtual channels of the request virtual channels allocated to the client circuits 156.

In block 406, read scheduler circuit 206 is capable of arbitrating among different ones of a plurality of client circuits 156 for which at least one beat of read completion data has been received and for which an EOP read request has been committed to at least one of the plurality of hosts. Read scheduler circuit 206 is capable of scheduling conveyance of the read completion data from response reassembly circuit 208 to the plurality of client circuits 156 for the plurality of request virtual channels.

In one or more examples, read scheduler circuit 206 includes arbitration circuit 304 configured to arbitrate among the plurality of data virtual channels and issue grants to selected data virtual channels of the plurality of data virtual channels (e.g., particular read request descriptions as stored in input buffers 308). Each data virtual channel and request virtual channel in which the data virtual channel is included corresponds to a selected client circuit 156. Read scheduler circuit 206 includes arbitration circuit 306 coupled to arbitration circuit 304. Arbitration circuit 306 is configured to arbitrate among the plurality of request virtual channels for which grants (e.g., to data virtual channels included in request virtual channels) have been issued by arbitration circuit 304.

Read scheduler circuit 206 includes a plurality of counters 312 including a counter for each data virtual channel and a plurality of counters 314 including a counter for each data virtual channel. Counters 312 and counters 314 each count received beats of read completion data on a per data virtual channel basis. That is individual counters of respective counters 312 and 314 are incremented under the same circumstances in response to the same events. Counters 312 specify eligibility of each data virtual channel to be considered by arbitration circuit 304 for a grant. Counters 314 are configured to maintain a count of beats of read completion data to be conveyed to the client circuits 156 on a per data virtual channel basis.

For example, arbitration circuit 304 is configured to decrement counters 312 by lengths of read requests for the plurality of data virtual channels causing selected ones of counters 312 to have negative values. Those counters 312 with negative values, e.g., the corresponding data virtual channels, are not considered for arbitration by arbitration circuit 304. Arbitration circuit 306 is configured to decrement counters 314 based on individual beats of read completion data conveyed to the plurality of client circuits.

In one or more examples, arbitration circuit 304 is configured to arbitrate only among each data virtual channel for which at least one beat of read completion data has been received by response reassembly circuit 208. Read scheduler circuit 206 also includes a plurality of counters 310 configured to count EOP read requests committed to the plurality of hosts for each of the data virtual channels. In one aspect, arbitration circuit 304 is configured to start scheduling for a selected data virtual channel only in response to determining that an EOP read request has been committed for the selected data virtual channel based on the plurality of counters 310.

In block 408, read scheduler circuit 206 is capable of implementing a credit mode selected from a plurality of different credit modes on a per data virtual channel basis. The credit modes control conveyance of beats of read completion data to the plurality of client circuits 156.

In one or more examples, the plurality of different credit modes includes a destination credit mode in which read scheduler circuit 206 maintains a pool of credits for conveyance of read completion data beat-by-beat. The pool of credits may be maintained in counters 316 (where each counter 316 corresponds to a particular data virtual channel). Individual ones of counters 316 are decremented as the credits are consumed when conveying individual beats of read completion data.

In one or more examples, the plurality of different credit modes include a notify credit mode in which read scheduler circuit 206 notifies a selected client circuit 156 of available read completion data for a selected data virtual channel and the selected client circuit 156 issues a dequeue request to read scheduler circuit 206 for a packet of read completion data. The notify credit mode initiates the conveyance of multiple beats of read completion data (e.g., a packet of read completion data) for the selected data virtual channel to the selected client circuit.

In block 410, DMA system 154 and, more particularly, data pipeline circuit 210, is capable of aligning read completion data provided to the plurality of client circuits 156 based on a data alignment specified by respective ones of the plurality of client circuits 156. Data pipeline circuit 210 is capable of implementing a plurality of data paths coupled to respective ones of the plurality of client circuits 156 for conveying the read completion data as scheduled by read scheduler circuit 206. In one or more examples, each data path includes an aligner circuit 218 that is configurable to align read completion data prior to sending the read completion data to a selected client circuit of the plurality of client circuits 156 based on a data alignment specified by the selected client circuit.

The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. The various forms of memory, as described herein, are examples of computer-readable storage media. A non-exhaustive list of examples of computer-readable storage media include an electronic storage device, a magnetic storage device, an optical storage device, an electromagnetic storage device, a semiconductor storage device, or any suitable combination of the foregoing. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "individual" and "user" each refer to a human being.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "real-time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A direct memory access (DMA) system disposed in a hardware accelerator integrated circuit, the DMA system comprising:

a read request circuit configured to receive read requests from a plurality of client circuits disposed in the hardware accelerator integrated circuit and submit the read requests to a plurality of bus controllers coupled thereto via a switch, wherein each bus controller is associated with one of a plurality of hosts;

a response reassembly circuit coupled to the plurality of bus controllers via the switch and configured to reorder beats of read completion data received from the plurality of hosts via the plurality of bus controllers in response to submission of the read requests;

a read scheduler circuit coupled to the read request circuit and the response reassembly circuit, wherein the read scheduler circuit is configured to schedule conveyance of the read completion data from the response reassembly circuit to the plurality of client circuits based on a read request description for each read request submitted to the plurality of controllers as provided from the read request circuit and a notification provided from the response reassembly circuit for each beat of read completion data received by the response reassembly circuit; and a data pipeline circuit coupled to the response reassembly circuit and the plurality of client circuits, the data pipeline circuit implementing a plurality of data paths coupled to respective ones of the plurality of client circuits for conveying the read completion data as scheduled by the read scheduler circuit.

2. The DMA system of claim 1, wherein the read scheduler circuit implements a credit mode selected from a plurality of different credit modes on a per data virtual channel basis.

3. The DMA system of claim 2, wherein the plurality of different credit modes includes a destination credit mode in which the read scheduler circuit maintains a pool of credits for conveyance of read completion data beat-by-beat.

4. The DMA system of claim 2, wherein the plurality of different credit modes include a notify credit mode in which the read scheduler circuit notifies a selected client circuit of available read completion data for a selected data virtual channel and the selected client circuit issues a dequeue request to the read scheduler circuit for a packet of read completion data.

5. The DMA system of claim 1, wherein the read scheduler circuit includes:

arbitration circuitry configured to arbitrate delivery of the read completion data from the response reassembly circuit to the data pipeline circuit for delivery to the plurality of client circuits only for read request chains for which an End-of-Packet (EOP) read request has been committed to one of the plurality of hosts, for which at least one beat of read completion data has been received, and for which the data pipeline circuit has sufficient space; and wherein each data path of the data pipeline circuit includes an alignment circuit that is configurable to align read completion data from the response reassembly circuit prior to sending the read completion data to a selected client circuit of the plurality of client circuits based on a data alignment specified by the selected client circuit on a per read request basis.

6. The DMA system of claim 5, wherein the read scheduler circuit comprises a plurality of counters configured to count the EOP read requests committed to the plurality of hosts for each of a plurality of data virtual channels.

7. The DMA system of claim 5, wherein the arbitration circuitry is further configured to arbitrate delivery of read completion data to the plurality of client circuits only for client circuits of the plurality of client circuits that have sufficient credit or have requested dequeue for an entire packet.

8. A direct memory access (DMA) system disposed in a hardware accelerator integrated circuit, the DMA system comprising:

a read scheduler circuit including:

a first arbitration circuit configured to arbitrate among a plurality of data virtual channels corresponding to a plurality of client circuits, wherein the first arbitration circuit is further configured to issue grants to selected data virtual channels of the plurality of data virtual channels;

a second arbitration circuit coupled to the first arbitration circuit and configured to arbitrate among the plurality of client circuits for which grants of data virtual channels have been issued by the first arbitration circuit;

a plurality of first counters including a first counter for each data virtual channel and a plurality of second counters including a second counter for each data virtual channel, wherein the plurality of first counters and the plurality of second counters each count received beats of read completion data on a per data virtual channel basis;

wherein the plurality of first counters specify eligibility of each data virtual channel to be considered by the first arbitration circuit for a grant;

wherein the plurality of second counters are configured to maintain a count of beats of read completion data to be conveyed to the plurality of client circuits on a per data virtual channel basis; and wherein the first arbitration circuit implements a credit mode selected from a plurality of different credit modes that control scheduling delivery of the read completion data to the plurality of client circuits, wherein the credit modes are implemented on a per-virtual channel basis, and wherein the plurality of different credit modes include:

a destination credit mode in which the read scheduler circuit delivers the read completion data to the plurality of client circuits, at least in part, responsive to virtual channels of the plurality of client circuits having available credits; and a notify credit mode in which the read scheduler circuit notifies different client circuits of the plurality of client circuits of available read completion data for associated data virtual channels and, in response, the different client circuits pull the read completion data at times selected by the different client circuits.

9. The DMA system of claim 8, wherein the first arbitration circuit is configured to decrement the first counters by lengths of read requests for the plurality of data virtual channels causing selected ones of the first counters to have negative values, wherein the first counters with negative values are not considered for arbitration by the first arbitration circuit.

10. The DMA system of claim 8, wherein the second arbitration circuit is configured to decrement the second counters based on individual beats of read completion data conveyed to the plurality of client circuits.

11. The DMA system of claim 8, wherein the read scheduler circuit includes:

a plurality of third counters configured to count end-of-packet (EOP) read requests that have been committed to a plurality of different hosts for the plurality of data virtual channels.

12. The DMA system of claim 11, wherein the first arbitration circuit is configured to start scheduling conveyance of data for a selected data virtual channel of the plurality of data virtual channels only in response to determining that an EOP read request has been committed for the selected data virtual channel based on the plurality of third counters.

13. The DMA system of claim 8, wherein first arbitration circuit is configured to arbitrate only among each data virtual channel of the plurality of data virtual channels for which at least one beat of read completion data has been received from a host based on the plurality of first counters.

14. The DMA system of claim 8, wherein the first arbitration circuit is configured to arbitrate delivery of data to the plurality of client circuits only for read request chains for which an End-of-Packet (EOP) read request has been committed to one of a plurality of hosts.

15. The DMA system of claim 14, wherein the first arbitration circuit is further configured to arbitrate delivery of data to the plurality of client circuits only for read request chains for which at least one beat of read completion data has been received.

16. The DMA system of claim 15, wherein the first arbitration circuit is further configured to arbitrate delivery of data to the plurality of client circuits only for client circuits of the plurality of client circuits that have sufficient credit or have requested dequeue for an entire packet.

17. A method implemented by a direct memory access system disposed within a hardware accelerator integrated circuit, the method comprising:

receiving, by a read request circuit, a plurality of read requests directed to a plurality of hosts, wherein the plurality of read requests are received from a plurality of client circuits conveyed over a plurality of request virtual channels, wherein the plurality of client circuits are disposed in the hardware accelerator integrated circuit;

submitting, by the read request circuit, the read requests to a plurality of bus controllers coupled thereto, wherein each bus controller is associated with one of a plurality of hosts;

reordering, by a response reassembly circuit, beats of read completion data received from the plurality of hosts in response to submission of the plurality of read requests;

arbitrating, by a read scheduler circuit, delivery of the read completion data to the plurality of client circuits only for read request chains for which at least one beat of read completion data has been received, for which an end-of-packet (EOP) read request has been committed to at least one of the plurality of hosts, and for which a destination client circuit of the read request chain has sufficient credit or has requested dequeue for an entire packet;

wherein read scheduler circuit arbitrates based on a read request description provided from the read request circuit for each read request submitted to the plurality of controllers and a notification provided from the response reassembly circuit for each beat of read completion data received by the response reassembly circuit; and conveying read completion data via a data pipeline circuit having a plurality of different data paths coupled to respective ones of the plurality of client circuits, wherein each data path includes an alignment circuit that is configurable to align read completion data prior to sending the read completion data to a selected client circuit of the plurality of client circuits based on a data alignment specified by the selected client circuit.

18. The method of claim 17, further comprising:

implementing a credit mode selected from a plurality of credit modes, wherein the plurality of credit modes control conveyance of beats of read completion data to the plurality of client circuits.

* * * * *